United States Patent [19]

Liu

[11] Patent Number: 4,933,038

[45] Date of Patent: Jun. 12, 1990

[54] METHOD AND APPARATUS FOR MAKING ELECTRICAL HEATER PAD

[76] Inventor: Dean S. Liu, 64 Hornshill Dr., Agincourt, Ontario, Canada, M1S 3J4

[21] Appl. No.: 261,554

[22] Filed: Oct. 24, 1988

[51] Int. Cl.⁵ .................... B32B 31/08; B32B 31/20
[52] U.S. Cl. ..................................... 156/176; 156/177;
156/312; 156/324; 156/440; 156/543; 156/555;
219/528; 219/542; 219/549; 338/293
[58] Field of Search ............... 156/440, 439, 177, 176,
156/179, 312, 274.2, 380.2, 555, 543, 324, 514;
219/528, 542, 544, 549; 338/293; 28/101

[56] References Cited

U.S. PATENT DOCUMENTS

| | | | |
|---|---|---|---|
| 2,076,343 | 4/1937 | Humphner | 154/2 |
| 2,102,392 | 12/1937 | Tea | 20/69 |
| 2,548,467 | 4/1951 | Crise | 219/46 |
| 2,613,306 | 10/1952 | Waltersdorf et al. | 219/544 X |
| 3,026,234 | 3/1962 | Eisler | 219/544 X |
| 3,062,946 | 11/1962 | Barber | 219/528 X |
| 3,336,557 | 8/1967 | Lund et al. | 219/528 X |
| 3,364,094 | 1/1968 | Rosler | 156/440 |
| 3,523,844 | 8/1970 | Crimmins et al. | 156/52 |
| 3,607,563 | 9/1971 | Bagnall | 156/439 |
| 3,743,559 | 7/1973 | Duby et al. | 156/177 |
| 4,052,239 | 10/1977 | Chen | 156/177 |
| 4,139,763 | 2/1979 | McMullan et al. | 219/544 X |
| 4,255,227 | 3/1981 | Hill | 156/555 |
| 4,481,065 | 11/1984 | Clausen et al. | 156/440 |
| 4,613,390 | 9/1986 | Mela | 156/177 |

FOREIGN PATENT DOCUMENTS

0251967 5/1964 Australia ............... 219/528
0270555 2/1914 Fed. Rep. of Germany ...... 156/440

Primary Examiner—Merrell C. Cashion, Jr.
Attorney, Agent, or Firm—Riches, McKenzie & Herbert

[57] ABSTRACT

A method of forming an electric heater pad having a continuous resistance heater wire which zig-zags transversely back and forth in longitudinally spaced runs secured intermediate two insulating sheets, the method comprising: (a) laying the wire inbetween the sheets by successive passes back and forth transversely between the sheets, (b) drawing the two sheets with the wire therebetween between two first pressure rollers to bond central areas of the sheets together leaving border strips on each transverse slide edge of the sheets unbonded, and (c) subsequently, bonding the sheets together over the border strips, wherein each successive pass comprises: (1) catching the wire between the sheets in a nip between the first rollers near the juncture of the border strips and central areas at one side, (2) drawing the wire transversely across the sheets to beyond the side edges of the sheets at the other side where tension is applied to the wire forming it into a straight run extending transversely across the sheets so that the straight run is promptly caught in the nip and secured between the sheets over said central areas, and (3) wherein before the step (1) of catching the wire in the next following pass, drawing portions of the wire which have been drawn out beyond the side edges of the sheet at the other side back transversely inward of the side edges of the sheet. This method ensures the wires are straight and properly spaced.

11 Claims, 7 Drawing Sheets

METHOD AND APPARATUS FOR MAKING ELECTRICAL HEATER PAD

SCOPE OF THE INVENTION

This invention relates to a method and apparatus for making an electrical heater pad.

BACKGROUND OF THE INVENTION

Electric heating pads are known which comprise a continuous resistance heating wire sandwiched between two insulating sheets typically of plastic. The wire zig-zags back and forth transversely of the sheets in longitudinally spaced runs, typically in the manner of a flat coil.

Past methods for forming the wire into the transverse runs have not proven satisfactory. In methods such as that taught by U.S. Pat. No. 4,613,390 to Mela and U.S. Pat. No. 2,548,467 to Crise, the zig-zagging wire is formed and laid onto one sheet before a second sheet is applied. These methods have the major disadvantage that the wires move and lose their desired relative positioning. The present applicant has appreciated the disadvantage that prior art methods do not maintain the wire tensioned substantially until the time when the wires are secured between the sheets. This has the disadvantage that the wires can become improperly located and spaced and slack in the wires, particularly with the expansion on heating of the wire can cause an increased localized heating leading to failure of the wire or seats.

Most prior art methods for forming heater pads fail to provide a simplified system for electrically coupling the heater wire to an electrical source.

SUMMARY OF THE INVENTION

Accordingly, in order to at least partially overcome these disadvantages, the present invention provides a method and apparatus for continuously forming heater pads by laying successive tensioned runs of wire between two sheets so that each run is promptly caught in a nip between pressure rollers and securely bonded between the sheets.

An object of the present invention is to provide a quick and efficient method and apparatus for continuous manufacture of heater pad units.

Another object is to provide a method whereby runs of heater wire are maintained substantially straight and tensioned until they are secured between their insulating sheets.

Another object is to provide a method and apparatus for continuous manufacture of heater pads of short lengths which provides both ends of the heater wire closely proximate each other for connection to an electrical source.

Accordingly, in one of its aspects, the present invention provides a method of forming an electric heater pad having a continuous resistance heater wire which zig-zags transversely back and forth in longitudinally spaced runs secured intermediate two insulating sheets, the method comprising:
  (a) laying the wire inbetween the sheets by successive passes back and forth transversely between the sheets,
  (b) drawing the two sheets with the wire therebetween between two first pressure rollers to bond central areas of the sheets together leaving border strips on each transverse slide edge of the sheets unbonded, and
  (c) subsequently, bonding the sheets together over the border strips,
wherein each successive pass comprises:
  (1) catching the wire between the sheets in a nip between the first rollers near the juncture of the border strips and central areas at one side,
  (2) drawing the wire transversely across the sheets to beyond the side edges of the sheets at the other side where tension is applied to the wire forming it into a straight run extending transversely across the sheets so that the straight run is promptly caught in the nip and secured between the sheets over said central areas, and
  (3) wherein before the step (1) of catching the wire in the next following pass, drawing portions of the wire which have been drawn out beyond the side edges of the sheet at the other side back transversely inward of the side edges of the sheet.

In another aspect the present invention provides, in an apparatus for forming an electric heater pad having a continuous wire which zig-zags transversely back and forth in longitudinally spaced runs intermediate two insulating sheets and in which two sheets are drawn between a first pair of pressure rollers to compress and bond the sheets together with the wire sandwiched therebetween, the apparatus having wire feed means including traveller means which in successive passes lays the runs of the wire between the sheets,
  the improvement wherein the traveller means traverses the sheets oscillating back and forth between two points each substantially in line with a nip line along which the first pressure rollers compress the sheets, one point transversely beyond the side edges of the sheets at one side and the other point transversely beyond the side edges of the sheets at the other side,
  tensioning means to tension the wire substantially when the traveller means is at each of the two points, and draw the wires substantially across the nip line of the first rollers,
  the first rollers bonding the two sheets together over central areas leaving side areas unbonded,
  wherein the movement of the traveller means and tensioning by the tensioning means are timed so as to draw wire laid beyond each side edge in a following successive pass back inside the side edges of the sheets in each subsequent pass before wire laid in the successive pass becomes caught in the nip between the first rollers, and
  second pressure roller means downstream from the first pressure roller means to bond the sheets together over the side areas.

BRIEF DESCRIPTION OF THE DRAWINGS

Further aspects and advantages of the present invention will appear from the following description taken together with the accompanying drawings in which.

DETAILED DESCRIPTION OF THE DRAWINGS

Figure 1:
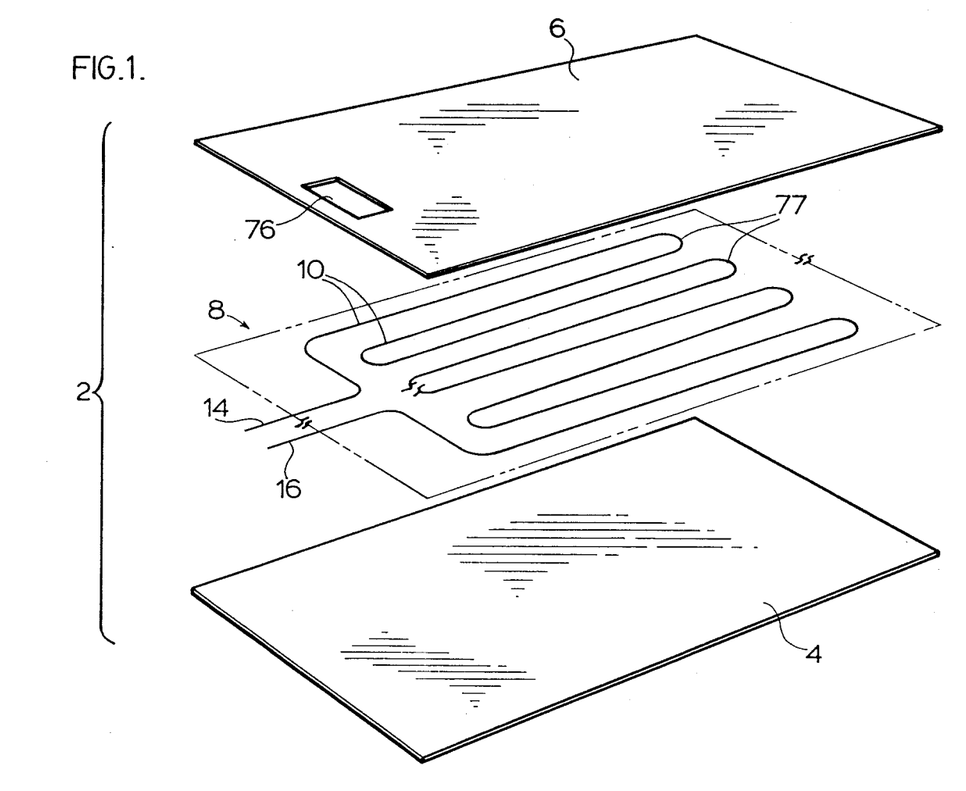
FIG. 1 is an exploded pictorial view of a heating pad made in accordance with the present invention.

Reference is made first to FIG. 1 which shows a preferred form of a heater pad 2 made in accordance with this invention. Pad 2 comprises a bottom sheet 4, a top sheet 6 and wire 8 which is to be sandwiched and bonded between the two sheets. Wire 8 zig-zags back and forth transversely across the sheets in a series of longitudinally spaced substantially parallel runs 10. Top sheet has a small opening 76 therethrough, through which the two ends 14 and 16 of the wire are to pass for connection to a power source. Sheets 4 and 6 are preferably bonded together over the entirety of their surfaces locking the wire in place.

Figure 2:
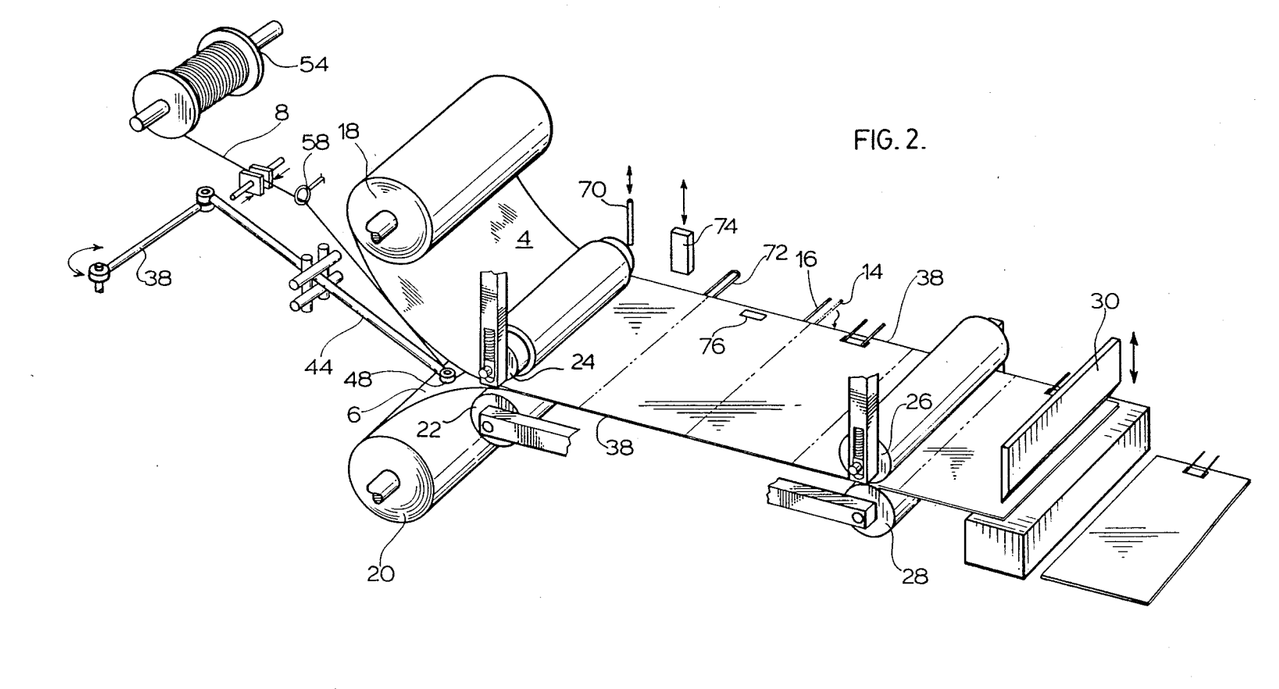
FIG. 2 is a schematic pictorial view of the preferred embodiment of an apparatus in accordance with the present invention.

FIG. 2 schematically shows the preferred apparatus in accordance with the present invention. Continuous top sheet 4 is dispensed from top feed roll 18 while continuous bottom sheet 6 is dispensed from bottom feed roll 20. The sheets are drawn between first pressure rollers 22 and 24 and subsequently between second pressure rollers 26 and 28. After the second pressure rollers, a cutting knife 30 cuts the bonded sheets into suitably sized pads.

Figure 3:
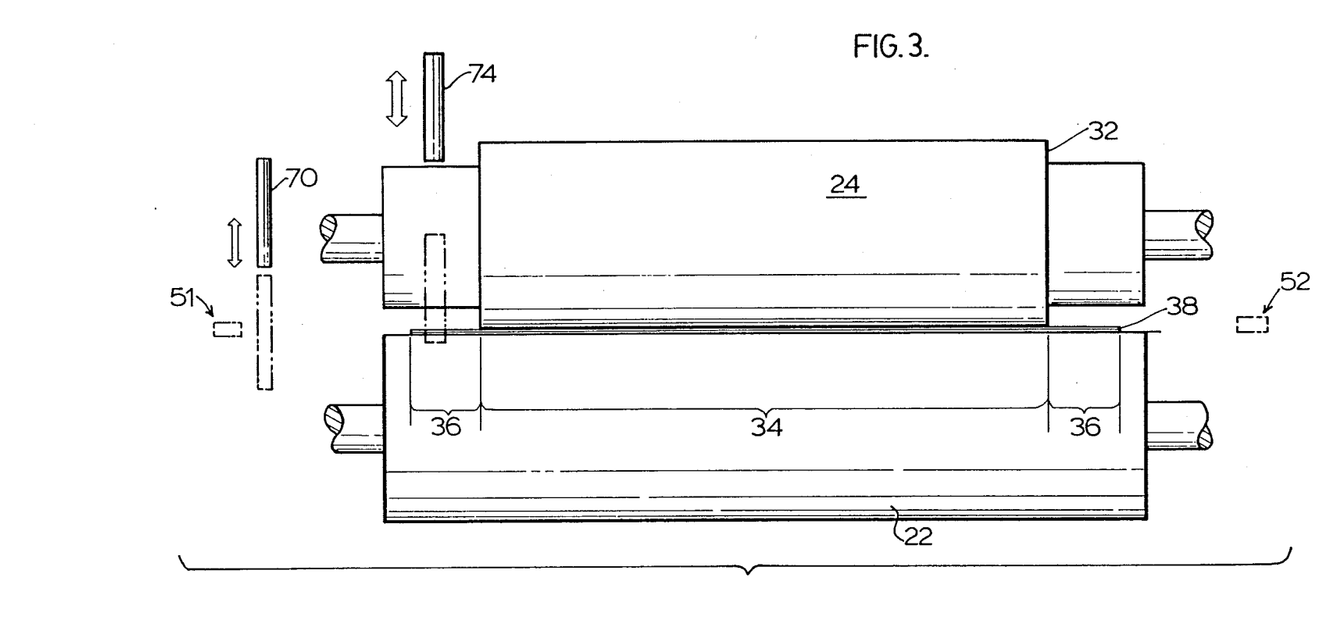
FIG. 3 is a front view of the first pressure rollers shown in FIG. 1.

First pressure rollers 22 and 24 are shown in FIG. 3. Roller 24 has recessed shoulders 32 at each end so that the first pressure rollers only compress and bond the sheets together over a central area of the sheets designated 34 leaving border strips 36 adjacent transverse side edges 38 where the sheets are not bonded together. The second pressure rollers at least compress and bond the sheets together over these border strips 36, preferably accomplishing this by compressing the sheets over their entire width.

The first and second pressure rollers are preferably heated sufficiently, having regard to the nature of the material comprising the sheets, to fuse the sheets together where they are compressed and thereby permanently bond the sheets together.

Figure 4:
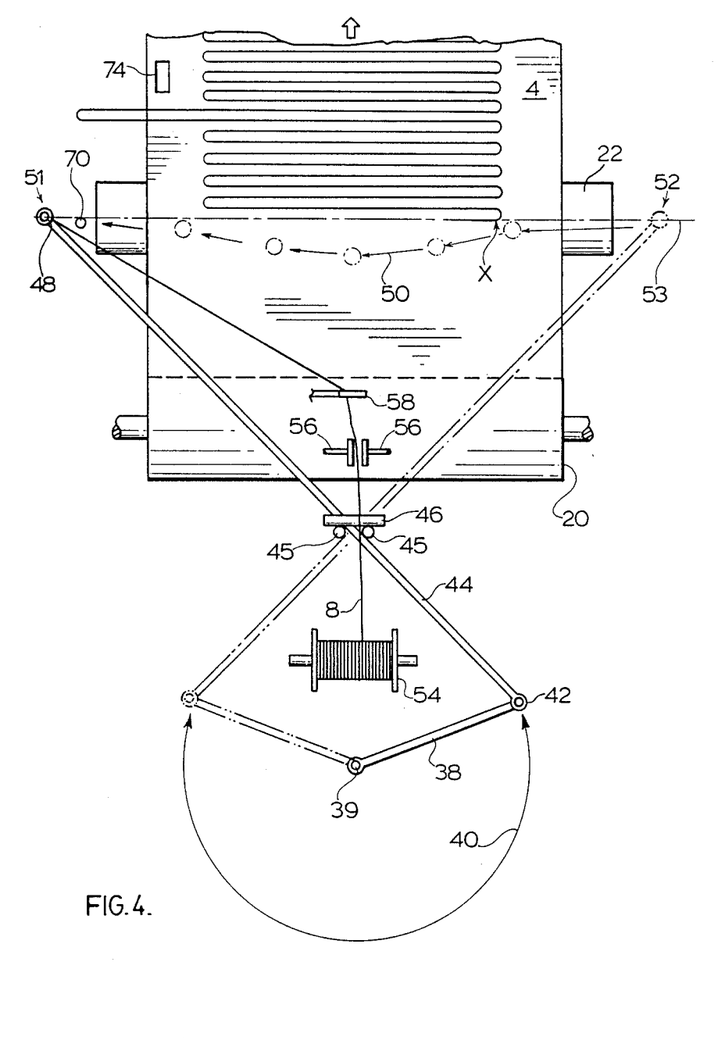
FIG. 4 is a schematic top view of forward most portions of the apparatus shown in FIG. 1 as if the upper first pressure roller and the upper sheet were removed.

As the sheets are drawn between the first pressure rollers, a wire feed mechanism, best shown in FIG. 4, feeds the wire inbetween the sheets so that the wire becomes sandwiched and bonded between the sheets. The preferred wire feed mechanism shown comprises a crank arm 38 journalled at one end on axis 39 for pivotal movement back and forth between the positions shown in dotted and solid lines in FIG. 4 through the arc indicated by arrow 40. A motor or other device, not shown, is provided to pivot the crank arm. Crank arm 38 is pivotally coupled at its other end 42 to a traveller arm 44. Traveller arm 44 is slidably received between two vertical rollers 45 and two horizontal rollers 46 so as to effectively provide a point generally indicated 47 about which the traveller arm may be slid and pivot. On pivoting of crank arm 38, traveller arm 44 slides and pivots relative to rollers 45 and 46 so as to move between the positions shown in dotted and full lines and with its feed eyelet 48 passing through the arc indicated by arrow 50 between end positions or points generally indicated 51 and 52.

FIGS. 3 and 4 show the location of these end points 51 and 52 relative to the first pressure rollers 22 and 24. The first pressure rollers have a nip line, shown as dashed-line 53 in FIGS. 3 and 4, where the rollers first grasp and compress the sheets. Points 51 and 52 are shown to substantially lie along nip line 53.

In operation of the apparatus with wire 8 caught in the nip between the first pressure rollers, for example, at point X on the right-hand side, as seen in FIG. 4, then with traveller arm 44 moved fully to the left-hand side as seen in solid lines and wire 8 tensioned so as to extend straight from point X to feed eyelet 48 at point 51 substantially parallel the nip line as shown, the wire will subsequently promptly become caught in the nip between the rollers and bonded therebetween as a substantially straight run.

Wire 8 is dispensed from a wire feed spool 54. Wire 8 passes from the spool between two clutch-like gripping plates 56, then through guide gromette 58, and subsequently through feed eyelet 48 to between the sheets. With wire 8 caught between the sheets, as traveller arm 44 zig-zags back and forth transversely to the sheets, the traveller arm lays successive runs 10 of the wire.

Gripping plates 56 are movable towards and away from each other between an open position in which wire 8 is free to pass between the plates and a closed position in which wire 8 is grasped and caught between the two plates. Preferably, plates 56 are biased as by spring means (not shown) to assume an open position and are activated as by an electric solenoid (not shown) to promptly assume the closed position. Co-ordination of the timing when the gripping plates 56 are opened and closed with movement of the traveller arm 44 serves to tension the wire as desired in each pass of the traveller arm.

Figure 5A:
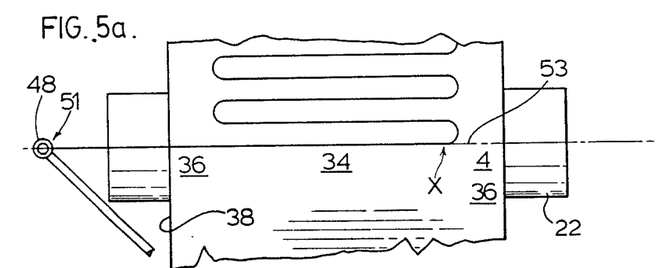
FIGS. 5a, 5b, 5c and 5d illustrate a section of the pad as seen in FIG. 4 but at successive time intervals as the sheet is drawn through the rollers during one pass of the traveller arm.

FIGS. 5a, 5b, 5c and 5d schematically show the sequence of events in each pass of arm 44. FIG. 5a corresponds to the position shown in FIG. 4 with the leading portion of wire 8 caught in the nip at X, feed eyelet 48 being at point 51 and wherein with gripper plates 56 clamped on the wire, the wire has been tensioned between point X and point, 51 into a straight line. This straight line of wire is imminently on its formation, on further rotation of the rollers, to become caught in the nip and bonded between the sheets as a straight run.

Figure 5B:
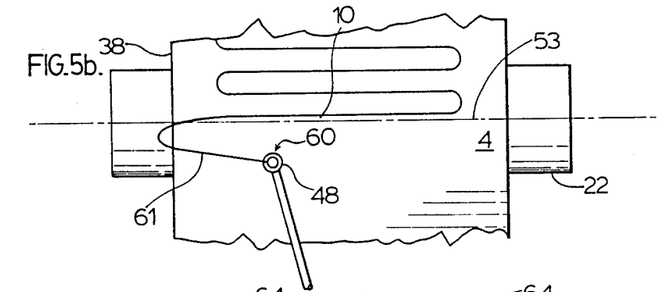

FIG. 5b shows feed eyelet 48 as having moved rightward from point 51 to point 60. About the time eyelet 48 leaves point 51, gripper plates 56 are opened so that movement of feed eyelet 48 lays wire in a loose loop 61 as shown. The last run 10 is shown in FIG. 5c as clearly caught in the sheets rearward of nip line 53.

Figure 5C:
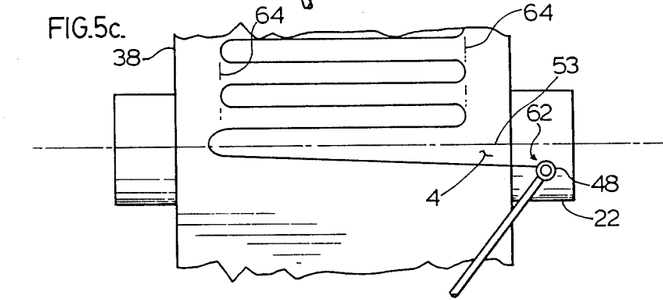

FIG. 5c shows eyelet 48 as having moved to point 62. Preceding portions of wire 8 which previously extended outwardly beyond side edge 38 have been drawn inside the side edge 38.

Figure 5D:
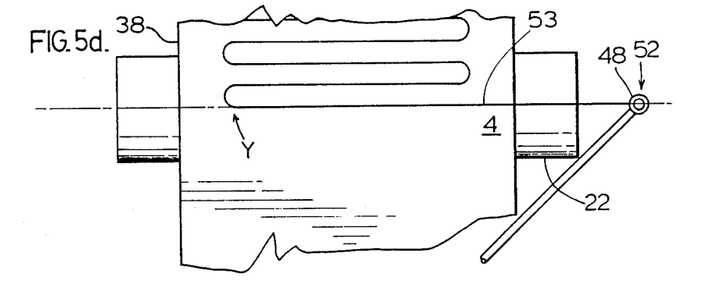

FIG. 5d shows eyelet 48 moved to its right-hand most position, point 52, and with the wire stretched taut from point Y caught in the nip at the left-hand side transversely across the sheets. When feed eyelet 48 was at about point 62 as shown in FIG. 5c, gripping plates 56 were activated to close and grasp wire 8. Subsequent movement of feed eyelet 48 from point 62 to point 52 draws wire 8 from its loose configuration as seen in FIG. 5c to the taut straight position in FIG. 5d. Closing of gripping plates 56 is timed to occur when the length of loose wire is that required to form a suitably tensioned straight run from point Y to point 52.

As the sheets are drawn between the first pressure rollers, the wire 8 is only caught and bonded over the central area 34 and is not bonded over the border strips 36. Dotted lines 64 in FIGS. 5 and 6 show the boundaries between the central area 34 and the border strips 36. As seen in FIGS. 5a to 5d, prior to any following portions of wire 8 being caught in the nip between the rollers, preceding portions of wire 8 which have been drawn outside the side edges 38 are drawn back inside the side edges. Thus, loose loop 61 in FIG. 5b is drawn inside side edges 38 before any following portions of the wire were caught in the nip.

In a manner similar to that described with respect to FIGS. 5a to 5d, the feed eyelet 48, would in a successive pass, move back from the right to the left. By repeated passes back and forth, a plurality of runs 10 are formed longitudinally spaced.

Figure 6A:
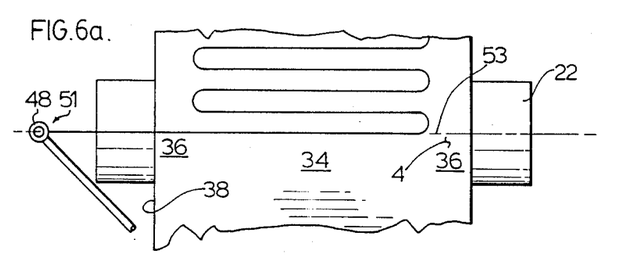
FIG. 6a, 6b, 6c and 6d are views similar to that of FIGS. 5b to 5d showing formation of a loop in the wire when a loop forming post is engaged.
Figure 6B:
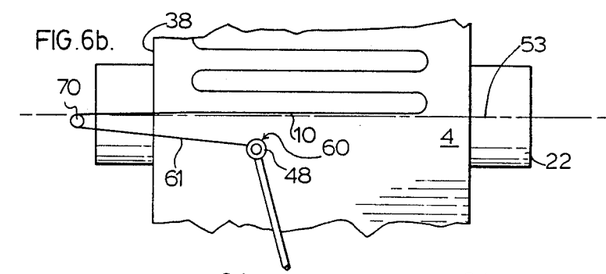
Figure 6C:
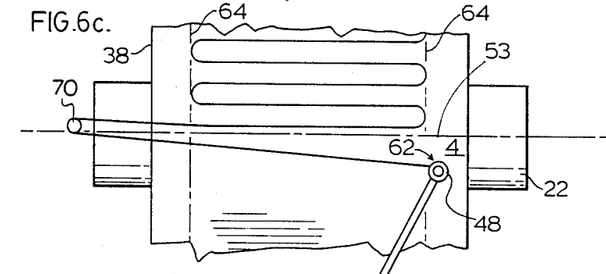
Figure 6D:
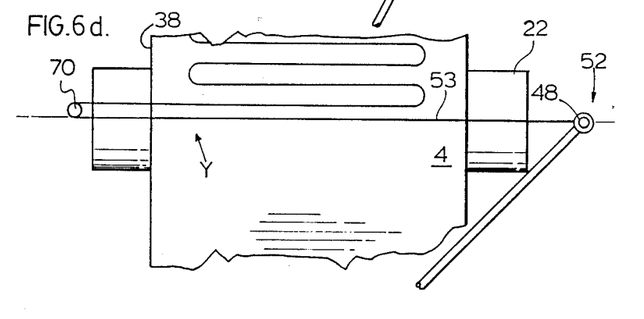

FIGS. 6a to 6d illustrate a pass of the feed eyelet in which a loop forming post 70 is utilized so as to form a loop 72 outside the side edges of the sheets. Loop forming post 70 is schematically shown in FIGS. 2 and 3 to comprise a vertically disposed thin rod which can be moved in the direction of arrow 74 vertically between a raised unengaged position shown in solid lines in FIG. 3 and a lower engaged position shown in dotted lines in FIG. 3. One relative location of post 70 is seen in top view in FIG. 4. Post 70 is moved to its lowered engaged position rearward of wire 10 immediately after feed eyelet 48 has moved to the position shown in FIG. 6a. On feed eyelet 48 moving to position 60 as seen in FIG. 6b, the feed eyelet 48 moves rearward of post 70 so that wire 8 passes around post 70 forming loop 72. Post 70 may then be moved forwardly to the position in FIG. 6c. Subsequently, in FIGS. 6c and 6d, the feed eyelet 48 moves across the sheet, tensioning the wire into a straight line to become bonded as the next run between the sheets but with loop 72 remaining outside one side edge 38 of the sheet. Before the next following pass, post 70 is withdrawn to its raised unengaged position. By activating post 70 periodically, for example, every 10 runs, loop 72 may be formed only every 10 runs.

Figure 7:
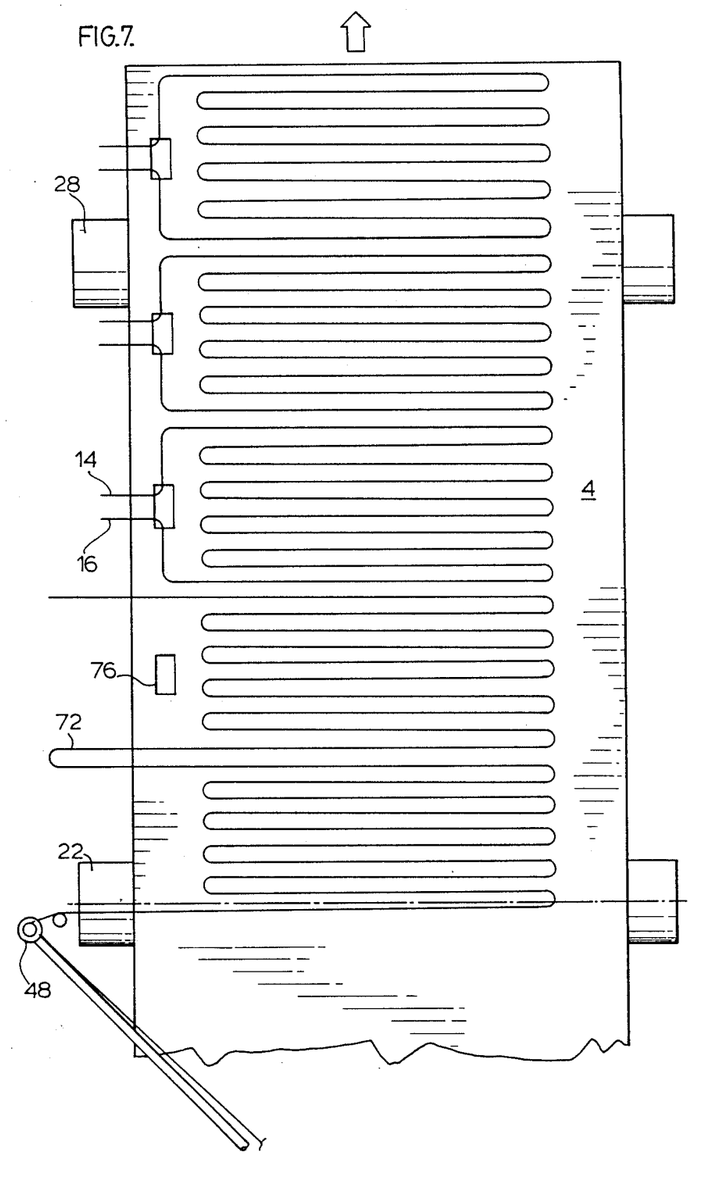
FIG. 7 is a top view of the apparatus shown in FIG. 2 showing downstream portions after the first pressure rollers.

FIG. 7 is a schematic top view showing the operations between the first and second pressure rollers. A hole punch device, schematically illustrated as 74 in FIGS. 2 and 3, is operated to periodically punch a hole 76 through top sheet 6. Hole 76 lies in the border strip 36 outside of the end bights 77 of wire 8 joining runs 10.

Hole 76 is preferably punched only through top sheet 6. The punch device may comprise a vertically movable punch. A thin flat plate (not shown) can be permanently located to extend between the two sheets 4 and 6 in the border strip 36 under the punch to serve as a platen.

Preferably, one hole 76 is cut in between each two end loops 72. Each loop 72 is cut to provide two wire end segments 14 and 16. The wire end segments adjacent each hole 76 are manually bent and laid to extend between the sheets in the border strip outward of the bights 77 to hole 76 and then out hole 76. This operation may be performed manually. Subsequently, on passing the sheets between the second pressure rollers, the sheets are bonded together over the border strips 36.

After passing through the second pressure rollers, cutting knife 30 cuts the bonded sheets together between the runs which were previously joined by loop 72. The resultant product is an individual pad as illustrated in FIG. 1.

Many minor modifications can be made to the illustrated embodiments. To eliminate air becoming trapped between sheets 4 and 6, the pressure rollers 22 and 24 may have circumferential grooves or roller 24 may be slightly angled relative to roller 22. The drawings show hole 76 to permit exit of wires 14 and 16. Alternately, two small slots may be provided.

Wire 8 may be dispensed from spool 54 either by spool 54 being free to rotate or preferably by a motor turning spool 54 in response to tension of the wire. Preferably, means can be provided to keep wire 8 under relatively constant tension rearward of the gripping plates 56. While gripping plates 56 are described to be activated by an electric solenoid, alternate gripping means could use mechanical activation means coupled to the movement of arm to time tensioning of the wire.

Traveller arm 44 is shown received on rollers 45 and 46. Alternate supports may be provided, preferably to include guides to guide the location of eyelet 48 at the forward most extension so that the wire may be precisely in the nip.

While the invention has been described with reference to preferred embodiments, the invention is not so limited. Many modifications and variations will now occur to a person skilled in the art. For definition of the invention reference is made to the appended claims.

What I claim is:

1. A method of forming an electric heater pad having a continuous resistance heater wire which zig-zags transversely back and forth in longitudinally spaced substantially parallel runs secured intermediate two electrically insulating sheets, the method comprising:
(a) laying the wire in between the sheets by successive passes back and forth transversely between the sheets,
(b) drawing the two sheets with the wire therebetween between two first pressure rollers to bond central areas of the sheets together leaving border strips on each transverse side edge of the sheets unbonded, and
(c) subsequently, bonding the sheets together over the border strips,
wherein each said successive pass of the wire comprises:
(1) catching the wire between the sheets in a nip between the first rollers near the juncture of the border strips and central areas at one side,
(2) drawing the wire transversely across the sheets to beyond the side edges of the sheets at the other side where tension is applied to the wire forming it into a straight run extending transversely across the sheets substantially parallel the nip so that the straight run is, promptly on its formation, caught in the nip and secured between the sheets over said central areas, and
(b 3) wherein before said step (1) of catching the wire in the next following pass, drawing portions of the wire which have been drawn out beyond the side edges of the sheet at the other side back transversely inward of the side edges of the sheet.

2. In an apparatus for forming an electric heater pad having a continuous wire which zig-zags transversely back and forth in longitudinally spaced substantially parallel runs intermediate two electrically insulating sheets and in which two sheets are drawn between a first pair of pressure rollers to compress and bond the sheets together with the wire sandwiched therebetween, the apparatus having wire feed means including traveller means which in successive passes lays the runs of the wire between the sheets, the improvement wherein the traveller means traverses the sheets oscillating back and forth between two points each substantially in line with a nip line along which the first pressure rollers compress the sheets, one point transversely beyond the side edges of the sheets at one side and the other point transversely beyond the side edges of the sheets at the other side, tensioning means to tension the wire substantially when the traveller means is at each of the two points, and form the wire into a straight run extending transversely across the sheets substantially parallel the nip line of the first rollers, the first rollers bonding the two sheets together over central areas leaving side areas unbonded and catching each successive straight run of wire in the nip line over the central areas promptly on formation of the straight run, wherein the movement of the traveller means and tensioning by the tensioning means are timed so as to draw wire laid beyond each side edge in a following successive pass back inside the side edges of the sheets in each subsequent pass before wire laid in the successive pass becomes caught in the nip line between the first rollers, and second pressure roller means downstream from the first pressure roller means to bond the sheets together over the side areas.

3. An apparatus as claimed in claim 2 additionally including catch means which in periodic passes retains outside of one side edge of the sheets, a loop of wire drawn outside the side edges of the sheets by the traveller means.

4. An apparatus as claimed in claim 3 further comprising cutting means downstream of the second pressure rollers to cut the bonded sheets into segments between runs whose ends have been retained by the catch means to form said loops.

5. An apparatus as claimed in claim 2 further including
first sheet feed means to feed the first sheet as a continuous sheet,
second sheet feed means to feed the second sheet as a continuous sheet, and
wire feeding means to supply the wire as a continuous wire between the sheets.

6. A method as claimed in claim 1 wherein said wire comprises a thin metal wire and said sheets comprise plastic materials which fuse together when heated,
the first pressure rollers sufficiently heating the sheets to fuse them together over the central areas.

7. An apparatus as claimed in claim 2 wherein said wire comprises a thin metal wire and said sheets comprise plastic materials which fuse together when heated,
the first pressure rollers sufficiently heating the sheets to fuse them together over the central areas.

8. An apparatus as claimed in claim 3 wherein said wire comprises a thin metal wire and said sheets comprise plastic materials which fuse together when heated,
the first pressure rollers sufficiently heating the sheets to fuse them together over the central areas.

9. In an apparatus for forming an electric heater pad having a continuous wire which zig-zags transversely back and forth in longitudinally spaced runs intermediate two electrically insulating sheets and in which two sheets are drawn between a first pair of pressure rollers to compress and bond the sheets together with the wire sandwiched therebetween, the apparatus having wire feed means including traveller means which in successive passes lays the runs of the wire between the sheets, the improvement wherein the traveller means traverses the sheets oscillating back and forth between two points each substantially in line with a nip line along which the first pressure rollers compress the sheets, one point transversely beyond the side edges of the sheets at one side and the other point transversely beyond the side edges of the sheets at the other side, tensioning means to tension the wire substantially when the traveller means is at each of the two points, and draw the wires substantially across the nip line of the first rollers, the first rollers bonding the two sheets together over central areas leaving side areas unbonded, wherein the movement of the traveller means and tensioning by the tensioning means are timed so as to draw wire laid beyond each side edge in a following successive pass back inside the side edges of the sheets in each subsequent pass before wire laid in the successive pass becomes caught in the nip between the first rollers, second pressure roller means downstream from the first pressure roller means to bond the sheets together over the side areas, and catch means which in periodic passes retains outside of one side edge of the sheets, a loop of wire drawn outside the side edges of the sheets by the traveller means.

10. An apparatus as claimed in claim 9 further comprising cutting means downstream of the second pressure rollers to cut the bonded sheets into segments between runs whose ends have been retained by the catch means to form said loops.

11. A method of forming an electric heater pad having a continuous resistance heater wire which zig-zags transversely back and forth in longitudinally spaced runs secured intermediate two electrically insulating sheets,
the method comprising:
(a) laying the wire in between the sheets by successive passes back and forth transversely between the sheets,
(b) drawing the two sheets with the wire therebetween between two first pressure rollers to bond central areas of the sheets together leaving border strips on each transverse side edge of the sheets unbonded, and
(c) subsequently, bonding the sheets together over the border strips,
wherein each said successive pass of the wire comprises:
(b 1) catching the wire between the sheets in a nip between the first rollers near the juncture of the border strips and central areas at one side,
(2) drawing the wire transversely across the sheets to beyond the side edges of the sheets at the other side where tension is applied to the wire forming it into a straight run extending transversely across the sheets so that the straight run is promptly caught in the nip and secured between the sheets over said central areas, and (3) wherein before said step (1) of catching the wire in the next following pass, drawing portions of the wire which have been drawn out beyond the side edges of the sheet at the other side back transversely inward of the side edges of the sheet, with the exception that in periodic of the passes, portions of the wire which have been drawn out beyond the side edges of the sheet are retained out beyond the side edges of the sheet.

* * * * *